US010391586B1

(12) United States Patent
Rea, Jr. et al.

(10) Patent No.: US 10,391,586 B1
(45) Date of Patent: Aug. 27, 2019

(54) METHOD FOR LASER-MARKING OF ANODIZED ALUMINUM

(71) Applicant: Coherent, Inc., Santa Clara, CA (US)

(72) Inventors: Edward C. Rea, Jr., Palo Alto, CA (US); Hatim Haloui, Kaiserslautern (DE)

(73) Assignee: Coherent, Inc. CA (US)

( * ) Notice: Subject to any disclaimer, the term of this patent is extended or adjusted under 35 U.S.C. 154(b) by 587 days.

(21) Appl. No.: 15/052,687

(22) Filed: Feb. 24, 2016

Related U.S. Application Data

(63) Continuation of application No. 15/005,894, filed on Jan. 25, 2016, now abandoned.

(60) Provisional application No. 62/131,760, filed on Mar. 11, 2015.

(51) Int. Cl.
*B23K 26/06* (2014.01)
*B23K 26/0622* (2014.01)
*B23K 26/356* (2014.01)
*B23K 26/359* (2014.01)

(52) U.S. Cl.
CPC ........ *B23K 26/0624* (2015.10); *B23K 26/356* (2015.10); *B23K 26/359* (2015.10)

(58) Field of Classification Search
CPC ............ B23K 26/0624; B23K 26/0069; B23K 26/0087; B23K 26/0057; B23K 26/0006; B23K 26/361
USPC ........................................ 219/121.69, 121.73
See application file for complete search history.

(56) References Cited

U.S. PATENT DOCUMENTS

| | | | |
|---|---|---|---|
| 6,552,301 B2 * | 4/2003 | Herman | C03B 29/02 219/121.71 |
| 6,664,498 B2 | 12/2003 | Forsman et al. | |
| 2006/0018349 A1 * | 1/2006 | Kopf | H01S 3/1075 372/30 |
| 2011/0182306 A1 * | 7/2011 | Hosseini | H01S 3/235 372/25 |
| 2013/0126573 A1 | 5/2013 | Hosseini et al. | |
| 2013/0235895 A1 * | 9/2013 | Mizuuchi | G02F 1/37 372/92 |
| 2014/0147694 A1 * | 5/2014 | Harrison | B23K 26/0081 428/600 |
| 2014/0363608 A1 * | 12/2014 | Russell-Clarke | B23K 26/0066 428/66.7 |

OTHER PUBLICATIONS

Gedvilas et al., "Grayscale Marking of Anodized Aluminium Plate by using Picosecond Laser and Galvanometer Scanner", Journal of Laser Micro/Nanoengineering, vol. 9, No. 3, 2014, pp. 267-270.
Lapczyna et al., "Ultra High Repetition Rate (133 MHz) Laser Ablation of Aluminum with 1.2-ps Pulses", Applied Physics A-69 [Suppl.], 1999, pp. S883-S886.

* cited by examiner

*Primary Examiner* — Brian W Jennison
(74) *Attorney, Agent, or Firm* — Morrison & Foerster LLP

(57) ABSTRACT

An aluminum covered with an anodically formed aluminum oxide layer is marked by repeated bursts of two or more individual laser pulses. The intensity of the individual pulses in the bursts is kept below a level experimentally determined to compromise the integrity of the aluminum oxide layer. The collective fluence in a burst is sufficient to mark the aluminum, but not sufficient to compromise the integrity of the oxide layer.

5 Claims, 2 Drawing Sheets

METHOD FOR LASER-MARKING OF ANODIZED ALUMINUM

PRIORITY

This application is a continuation of U.S. patent application Ser. No. 15/005,894, filed Jan. 25, 2016, which in turn claims priority to U.S. Provisional Application Ser. No. 62/131,760 filed Mar. 11, 2015, both of which are hereby incorporated by reference in their entirety.

TECHNICAL FIELD OF THE INVENTION

The present invention relates in general to laser marking of metals. The invention relates in particular to laser marking of anodized aluminum.

DISCUSSION OF BACKGROUND ART

Anodized aluminum is aluminum on which an aluminum oxide layer is grown by an electrolytic process in an acid electrolyte solution. The term "anodized" derives from the fact that aluminum on which the oxide is grown is the anode in the electrolytic process. This anodically grown aluminum oxide layer augments a naturally occurring layer, about 2 nanometers (nm) thick, which forms on aluminum when the aluminum is exposed to air. An anodically grown oxide layer can be between about 0.5 micrometers (μm) and 100 micrometers thick. Acid solutions used for anodizing include chromic acid, sulfuric acid, and certain organic acids.

Anodic aluminum oxide layers grown in acid solutions are porous. The porosity is required for the electrolytic process in order to allow the electrolyte solution to contact aluminum metal. After the electrolytic growth, the oxide layer is sealed by a corrosion inhibitor which may include a dye for providing colored anodized articles.

Recently developed laser marking methods of anodized aluminum are described in a paper, "Grayscale Marking of Anodized Aluminium Plate by Using Picosecond Laser and Galvanometer Scanner", by M. Gedvilas et al, Journal of Laser Micro/Nanoengineering, Vol. 9 (3), pages 267-270 (2014). These methods employ a commercially available pulsed laser delivering a beam of pulses having a duration of about 10 picoseconds (ps). The pulses have a wavelength of about 1040 nm, and can be delivered with variable power and pulse repetition frequency (PRF). The beam of pulses is scanned over an anodized aluminum workpiece being marked in a manner such that there is some spatial overlap of pulses on the workpiece. Grayscale marking is achieved by adjusting the pulse power, PRF, and the degree of spatial overlap. Laser radiation fluence in a pulse incident on the workpiece is kept below an ablation threshold for the aluminum.

Applicants have attempted to reproduce results in the Gedvilas et al paper with limited success. Problems were encountered in particular with dyed anodized aluminum samples and with samples of different origin, presumably anodized by different processes. These problems included damage or delamination of the oxide layer during the marking process, or delamination and corrosion occurring during testing of marked samples in a salt-fog test. There is a need for a laser marking process which can be used with anodized samples of different color or different origin without damaging or adversely affecting the anodic oxide layer.

SUMMARY OF THE INVENTION

The present invention is directed to laser marking a workpiece of aluminum covered by an anodically formed, corrosion resistant aluminum oxide layer. In one aspect the method comprises irradiating the aluminum, through the oxide-layer, with repeated bursts of two or more optical pulses while scanning the bursts of pulses over the workpiece surface. The temporal separation of consecutive pulses in the bursts thereof is less than about 25 nanoseconds (ns). The repetition frequency of the bursts is at least about 400 kilohertz (kHz). The fluence of an individual optical pulse on the workpiece surface is below a level determined to compromise the corrosion resistance of the aluminum oxide layer.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
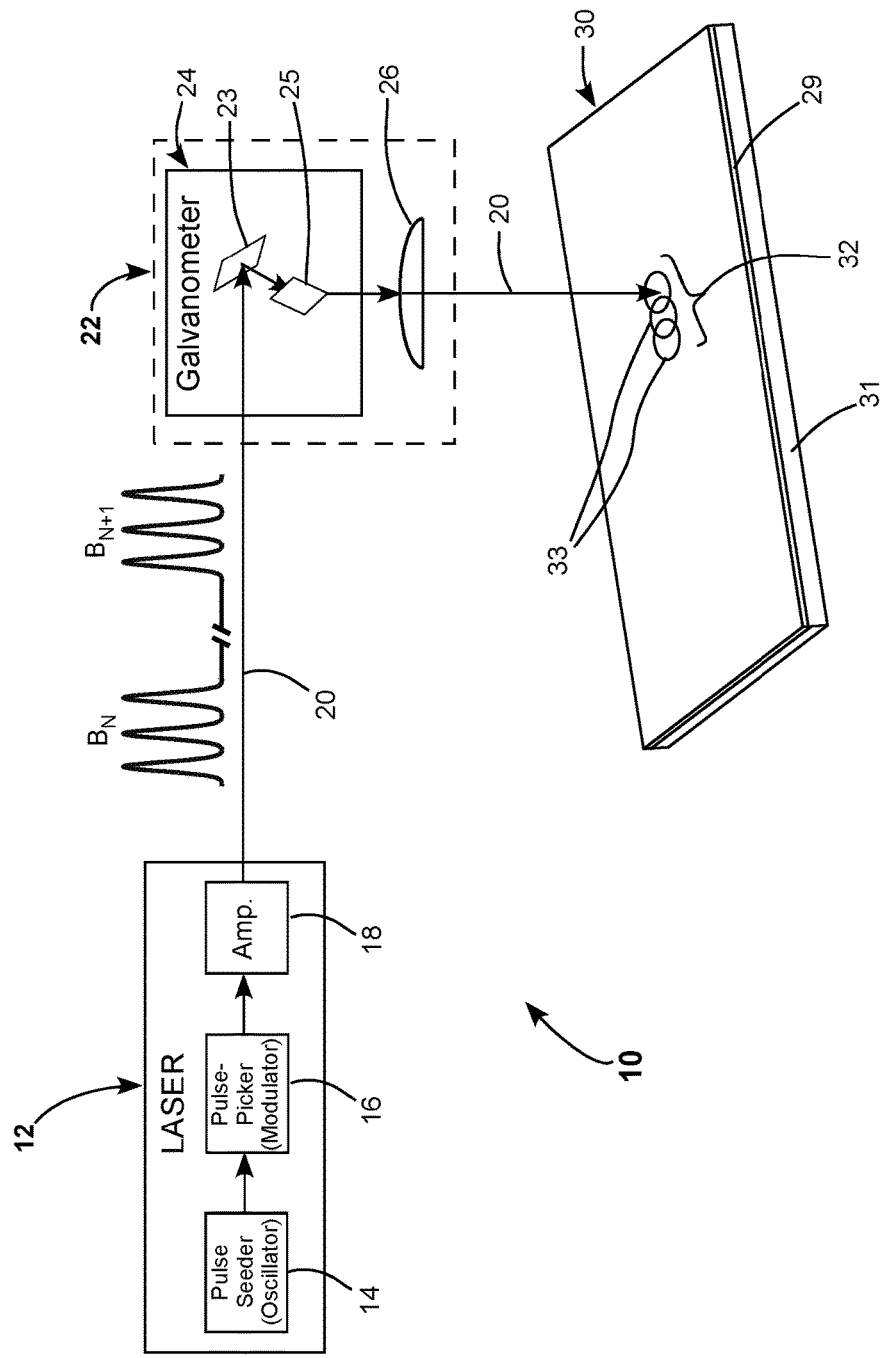
FIG. 1 schematically illustrates a preferred embodiment of a method and apparatus in accordance with the present invention for gray-scale marking of anodized aluminum, including a pulsed laser configured to deliver a beam of repeated bursts of pulses, and a beam-delivery system to scan the beam on the surface of an anodized aluminum workpiece.

Referring now to the drawings FIG. 1 schematically illustrates a preferred embodiment 10 of a method and apparatus in accordance with the present invention for gray-scale marking of anodized aluminum. A pulsed-laser system 12 includes a mode-locked oscillator (pulse seeder) 14, a modulator (pulse-picker) 16, and an optical amplifier 18, which may have one or more amplification stages. Modulator 16 either allows pulses to reach amplifier 18 or prevents pulses from reaching amplifier 18.

Oscillator 14 provides seed-pulses at a pulse-repetition frequency (PRF) of tens of megahertz (MHz), for example 50 MHz. The pulses preferably have a duration less than 20 ps. Laser 12 is operable by user controlled software such that pulses are delivered in repeated bursts thereof, schematically depicted here as bursts $B_N$ and $B_{N+1}$. This is referred to by practitioners of the art as "burst-mode" operation of a laser system. Pulses in each burst are temporally separated by the reciprocal of the oscillator PRF, for example, 20 ns for a PRF of 50 MHz. The bursts are repeated at a burst-repetition frequency (BRF) less than that of the PRF.

By way of example, modulator 16 could be programed to allow only the first, second and third; fifty-first, fifty-second, and fifty-third; one-hundred-first, one-hundred-second, and one-hundred-third, and so on, consecutive pulses to reach the amplifier. In the case of a 50 MHz PRF of oscillator 14, this would provide repeated bursts of three pulses with a PRF of 50 MHz at a BRF of 1 MHz, i.e., with consecutive bursts temporally separated by 1 microsecond (μs).

It is pointed out, here, that only sufficient details of the configuration and operation of laser 12 are provided for understanding principles of the present invention. Lasers that can be operated in the above-described burst-mode are commercially available. One such laser is a HYPER RAPID laser available from Coherent Inc. of Santa Clara, Calif.

Continuing with reference to FIG. 1, the repeated bursts of pulses from laser 12 are delivered in a beam 20 to a beam delivery arrangement 22 including a galvanometer 24 and a f-theta (telecentric) lens 26. Galvanometer 22 includes mirrors 23 and 25 for scanning beam 20 in two mutually perpendicular axes (not shown). Beam 20 is focused by f-theta lens 26 onto a workpiece 30 including an aluminum base 31 having an anodically formed, protective (corrosion resistant), aluminum oxide layer 29 thereon. Preferably, the beam is focused at an interface between the oxide-layer and the aluminum base.

The beam is preferably scanned over workpiece 30 at a speed such that areas 33, each thereof irradiated by one burst of pulses, partially overlap to form a pattern 32. Clearly, within each area 32 there will be much tighter overlapping sub-areas (not shown) resulting from individual pulses in a burst. For example, for a BRF of 1 MHz and scan speed of 4 meters per second (m/s) over workpiece 30, each burst of pulses is spatially shifted by approximately 4 µm. Furthermore, for a beam spot size of 65 µm diameter on workpiece 30, the overlap of areas 33 is approximately 92%. The extent of overlap determines the gray-scale values produced by the laser marking, and is adjusted by varying the galvanometer scan rate.

Figure 2:
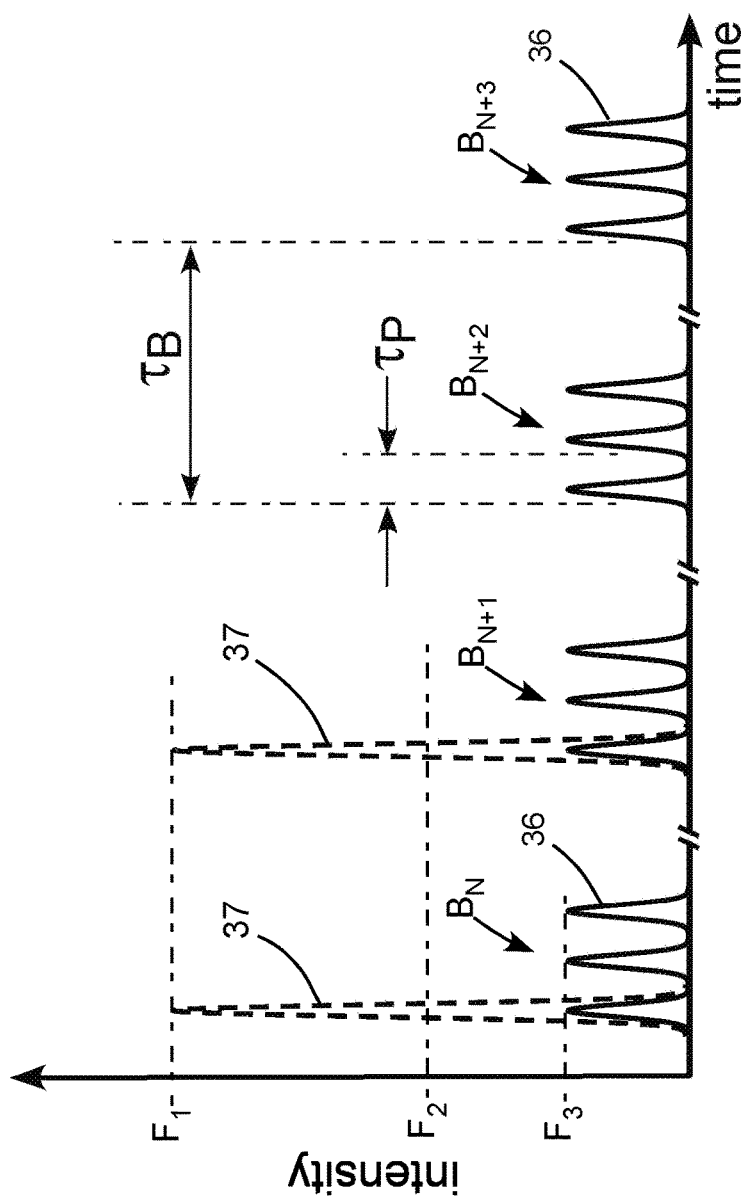
FIG. 2 is a graph schematically illustrating laser-pulse intensity as a function of time in a preferred arrangement of the repeated bursts of pulses of FIG. 1.

FIG. 2 is a graph schematically illustrating details of laser-pulse intensity (fluence) as a function of time in a preferred arrangement of the repeated bursts of pulses of FIG. 1. For reference, repeated single pulses 37 of prior-art marking methods, such as described in the above-referenced Gedvilas et al paper, are depicted in phantom. The prior-art pulses have a peak intensity, generally designated $F_1$, of a magnitude required to effect marking of anodized samples. This, as discussed above, was found by applicants to result in frequent failure of the anodically formed layer, particularly in dyed anodized samples. Failure could occur immediately on irradiation for marking, or through subsequent corrosion.

Failure modes, in order of decreasing fluence in a single pulse could be categorized as: instantaneous delamination of the anodized layer during the marking process; degradation of the anodized layer during the marking process; and early-life failure due to the protective function of the layer being compromised by the degradation. An early-life failure event means the workpiece failed to meet requirements for not corroding or delaminating before an expected lifetime.

In order to determine whether or not the protective function (corrosion resistance) of the aluminum oxide-layer had been compromised, marked samples were subjected to a salt-fog test similar to that specified in MIL-C-675C paragraph 4.5.9. It was determined that if a marked sample passed this test, there could be a high degree of confidence that the protective function of the oxide-layer had not been compromised and that the oxide-layer would remain protective over a useful lifetime. Using a prior-art method of repeated single pulses (such as pulses 37), it was found, however, that for dyed (colored) anodized samples in particular, the peak fluence of a pulse could not be reduced to a level sufficiently low that the salt-fog test could be reliably passed without compromising the effectiveness of the marking process.

In the method of the present invention, the prior-art repeated single pulses 37 are replaced with repeated bursts of pulses 36, here, designated $B_N$, $B_{N+1}$, $B_{N+2}$, and $B_{N+3}$. In the drawing, there are 3 pulses per burst. Generally there must be at least two pulses per burst up to a practical maximum of about 10 pulses per burst.

As noted above, the pulses have a FWHM duration less than about 20 ps. The temporal separation $\tau_P$ of pulses in a burst is preferably between about 20 ns and 25 ns. The temporal separation $\tau_B$ between bursts is preferably not less than 1 µs.

What is important in the method of the present invention is that the peak intensity $F_3$ of pulses 36 in the bursts thereof is less than a value $F_2$ experimentally or otherwise determined to be the lowest intensity which could compromise the protective function of the oxide layer in samples of any anticipated color or origin. The number of pulses in a burst is selected, cooperative with pulse-intensity $F_2$ such that the collective intensity (fluence) in a burst is sufficient to effect reliable marking of the workpiece, essentially reproducing the fluence of a single prior-art pulse with a multi-pulse burst having an equal collective fluence. What is surprising and fortuitous is that this same collective fluence does not cause the immediate or subsequent damage that would be caused by a single pulse of the same total fluence.

Laser-marking experiments were performed on various colored anodized aluminum samples using the method of the present invention wherein bursts with three pulses each were arbitrarily selected with burst repetition frequency of 1 MHz, pulse separation of about 20 nanoseconds, pulse duration of about 15 picoseconds, and fluence of incident beam 20 at surface spots 32 of 0.07 and 0.1 Joule per square centimeter and pulse energy of about 2.2 and 3.2 microJoule (µJ). Using the lower values of fluence and pulse energy as stated above, all marked samples of colored anodized aluminum did not exhibit immediate damage or delamination from the laser-marking, or delamination or corrosion when subjected to a salt-fog test.

From the description provided above, those skilled in the art may readily devise by experiment other combinations of pulse duration, pulse repetition rate, number of pulses per burst, and amount of overlap of irradiated areas that achieve desired gray-scale marking without damage, delamination or corrosion without departing from the spirit and scope of the present invention. This could be done while still keeping the intensity of an individual pulse below 0.1 J/cm$^2$.

In summary, the present invention is described above in terms of preferred and other embodiments. The invention however is not limited by the embodiments described and depicted herein, rather the invention is limited by the claims appended hereto.

What is claimed is:

1. A method of marking a workpiece of aluminum covered by an anodically formed, corrosion resistant aluminum oxide layer, comprising:
   irradiating the aluminum, through the oxide-layer, with repeated bursts of two or more optical pulses while scanning the bursts of pulses over the workpiece surface, each location on the workpiece that is irradiated receiving at least one burst of consecutive optical pulses, the temporal separation of consecutive pulses in the bursts thereof being less than about 25 nanoseconds, the repetition frequency of the bursts being at least about 400 kilohertz, and the fluence level of an individual pulse in a burst on the workpiece surface is less than about 0.1 Joules per square centimeter in order to mark the workpiece without compromising the corrosion resistance of the aluminum oxide layer.

2. The method of claim 1, wherein the bursts of pulses are scanned over the workpiece surface at a rate such that an area irradiated by one burst of pulses is partially overlapped by an area irradiated by the next burst of pulses.

3. The method of claim 1, wherein the temporal separation of pulses in a burst thereof is between 20 and 25 nanoseconds.

4. The method of claim 1, wherein individual pulses have a pulse-duration less than about 20 picoseconds.

5. The method of claim 1, wherein the bursts of pulses are delivered at a repetition rate of about 1000 KHz.

* * * * *